United States Patent
Hölzel

(10) Patent No.: US 9,902,244 B2
(45) Date of Patent: Feb. 27, 2018

(54) ARRANGEMENT COMPRISING A COVER FOR A VEHICLE ROOF

(71) Applicant: Webasto SE, Stockdorf (DE)

(72) Inventor: Dominik Hölzel, Olching (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/309,771

(22) PCT Filed: Apr. 22, 2015

(86) PCT No.: PCT/EP2015/058706
§ 371 (c)(1),
(2) Date: Nov. 8, 2016

(87) PCT Pub. No.: WO2015/172987
PCT Pub. Date: Nov. 19, 2015

(65) Prior Publication Data
US 2017/0267077 A1    Sep. 21, 2017

(30) Foreign Application Priority Data

May 14, 2014   (DE) .......................... 10 2014 106 813

(51) Int. Cl.
B60J 7/043    (2006.01)
B60J 7/02    (2006.01)

(52) U.S. Cl.
CPC ............. B60J 7/0435 (2013.01); B60J 7/024 (2013.01)

(58) Field of Classification Search
CPC ... B60J 7/0435; B60J 7/05; B60J 7/057; B60J 7/047

(Continued)

(56) References Cited

U.S. PATENT DOCUMENTS 4,678,228 A * 7/1987 Boots ..................... B60J 7/0435
                                                    296/216.03
5,058,947 A * 10/1991 Huyer ................... B60J 7/0435
                                                    296/216.03

(Continued)

FOREIGN PATENT DOCUMENTS

DE  20 2010 012974 U1   4/2012
DE  10 2010 018151 A1  10/2012

(Continued)

OTHER PUBLICATIONS

International Search Report for PCT/EP2015/058706 dated Jun. 30, 2015; English translation submitted herewith (6 Pages).

(Continued)

*Primary Examiner* — Dennis H Pedder
(74) *Attorney, Agent, or Firm* — Fitch, Even, Tabin & Flannery, LLP

(57) ABSTRACT

An arrangement with a cover for a vehicle roof, which can be raised for opening by way of deployment means in the rear region thereof and which cover can be displaced toward the rear over the vehicle roof into an open position. The deployment means have a displaceable sliding carriage and a rear deployment lever which is pivotably coupled to the cover and which is pivotably coupled to a bearing which is stationary fixed with respect to the guide rail and which has a first coupling element. Furthermore, the deployment means have a deployment rod for the deployment of the rear deployment lever. The stationary fixed bearing is arranged such that a pivot axis of the stationary fixed bearing is arranged above a base of the guide rail.

8 Claims, 2 Drawing Sheets

(58) Field of Classification Search
USPC .......... 296/216.02–216.05, 220.01, 221–223
See application file for complete search history.

(56) References Cited

U.S. PATENT DOCUMENTS

| | | |
|---|---|---|
| 5,405,185 A | 4/1995 | Cheron et al. |
| 7,344,188 B2 | 3/2008 | Sawada et al. |
| 8,807,646 B2 | 8/2014 | Grimm et al. |
| 2013/0099528 A1 | 4/2013 | Grimm et al. |

FOREIGN PATENT DOCUMENTS

| | | |
|---|---|---|
| DE | 10 2012 106545 A1 | 1/2014 |
| EP | 1 535 780 A2 | 6/2005 |
| EP | 2 263 897 A1 | 12/2010 |
| EP | 2 727 755 A1 | 5/2014 |
| JP | S63-180420 U | 11/1988 |
| JP | H06-199133 A | 7/1994 |
| JP | 2004-1605 A | 1/2004 |
| JP | 2005-162064 A | 6/2005 |
| JP | 2012-91582 A | 5/2012 |

OTHER PUBLICATIONS

Notification of Reasons for Refusal, Japanese Application No. 2016-567245, dated Dec. 5, 2017, together with English language summary thereof.

\* cited by examiner

ARRANGEMENT COMPRISING A COVER FOR A VEHICLE ROOF

CROSS-REFERENCE TO RELATED APPLICATIONS

This application is a U.S. national phase application filed under 35 U.S.C. § 371 of International Application No. PCT/EP2015/058706, filed Apr. 22, 2015, designating the United States, which claims priority from German Patent Application Nos. 10 2014 106 813.0 and 10 2014 109 698.3 filed May 14, 2014 and Jul. 10, 2014, respectively, which are hereby incorporated herein by reference in their entirety for all purposes.

FIELD

The invention relates to an arrangement with a cover for a vehicle roof, which cover, starting from a closed position for closing a roof opening, can be raised for opening using deployment means in the rear region thereof and which cover can be displaced toward the rear over the vehicle roof into an open position.

BACKGROUND

Such arrangements having a cover for a vehicle roof are known in many forms from the prior art. Typically, during the opening operation, a drive carriage is displaced toward the rear in the vehicle longitudinal direction. In lateral regions of the cover, deployment means are provided in order to raise the cover into a venting position before said cover is displaced further to the rear into an open position in order to open the roof opening.

The deployment means, which typically have components such as levers, bearings and/or slotted links, require corresponding structural space in order to make it possible to perform the opening process, which sometimes reduces the space in a passenger compartment of a vehicle.

An object forming the basis of the invention is to describe an arrangement with a cover for a vehicle roof which is distinguished by the fact that it takes up little structural space.

SUMMARY

According to the invention there is described an arrangement with a cover for a vehicle roof, which cover, starting from a closed position for closing a roof opening, can be raised in the rear region thereof for opening using deployment means and which cover can be displaced toward the rear over the vehicle roof into an open position. The deployment means have a sliding carriage which can be displaced in a guide rail along the vehicle longitudinal direction by means of a drive. The deployment means furthermore have a rear deployment lever with respect to the vehicle longitudinal direction, which rear deployment lever is pivotably coupled to the cover and which rear deployment lever is pivotably coupled to a bearing which is stationary fixed with respect to the guide rail and which rear deployment lever has a first coupling element. The deployment means furthermore have a deployment rod which is pivotably coupled by way of the first coupling element to the rear deployment lever and which deployment rod is, by way of the sliding carriage, displaceable in the vehicle longitudinal direction for the deployment of the rear deployment lever. The stationary fixed bearing is arranged such that a pivot axis of the stationary fixed bearing is arranged above a base of the guide rail, and wherein the deployment rod is coupled to the first coupling element such that, starting from the closed position of the cover, during a displacement of the sliding carriage along the vehicle longitudinal direction, the deployment rod overruns the fixed bearing.

The displacement of the cover over the vehicle roof means that the cover, after lifting or deployment in the region of a rear edge of the cover, is pushed over an outer side of the vehicle roof. Preferably, the arrangement is an arrangement for a spoiler roof.

The location indications or directional indications used, such as "rear" or "front", relate to the vehicle longitudinal direction. The vehicle longitudinal direction may also be referred to as the horizontal direction or X direction. The deployment or lifting of the cover is carried out substantially in a vertical direction or Z direction. The rear region of the cover is intended, for example, to be understood to be the region which, starting from a center of the cover, faces the rear of the vehicle.

The arrangement provides that the stationary fixed bearing for the rear deployment lever is arranged such that a pivot axis of the fixed bearing is arranged above the base of the guide rail. Here, a base of the guide rail is to be understood to mean a plane which runs approximately parallel to a vehicle roof of the vehicle below the sliding carriage. In other words, the base denotes that region of the guide rail which, in the closed position of the cover, has the greatest spacing to the cover in a vertical direction.

For the deployment of the rear deployment lever, the deployment rod is displaced rearward in the vehicle longitudinal direction. Here, the rear deployment lever is pivoted relative to the pivot axis of the fixed bearing. Furthermore, the deployment rod overruns the fixed bearing, in order that the deployment rod does not collide with the fixed bearing. In the present context, "overruns" means that, during the displacement of the sliding carriage, the deployment rod, at least in the rear region, performs a vertical movement, that is to say a movement in the Z direction. In other words, the fixed bearing is arranged substantially at the same height as the deployment rod in the closed position of the cover. During a displacement of the deployment rod, said deployment rod is guided over the bearing.

The arrangement makes it possible for the required structural space to be considerably reduced, in particular because the fixed bearing does not have to be arranged below the base of the guide rail. In this way, when the arrangement is used in a vehicle, the space in a passenger compartment can be enlarged, which makes it possible, for example, to realize a greater amount of headroom for occupants of the vehicle. Furthermore, by way of the arrangement, so-called "water pockets" are avoided. If the fixed bearing were arranged below the base of the guide rail, it would be necessary, in the roof construction of the vehicle, to provide a recess formed in the direction of gravitational force, in which recess water can collect. Said water would be dischargeable only with difficulty and would for example promote corrosion of components.

In one refinement of the invention, the deployment rod has, for the coupling to the rear deployment lever, a first slotted link which engages with the first coupling element of the rear deployment lever, such that, starting from the closed position of the cover, during a displacement of the sliding carriage, the first slotted link controls a deployment of the cover. Through the provision of the first slotted link, it is made possible for the cover to be deployed or raised with particularly low friction and with the lowest possible forces.

Furthermore, the deployment rod may be produced in one piece with the first slotted link.

In a further refinement of the invention, the first slotted link has in the closed position of the cover a path in which, toward the rear in the vehicle longitudinal direction, a spacing between the first slotted link and the cover initially varies and subsequently remains constant. Here, the variation of the spacing is to be understood to mean a significant change of the spacing, wherein the path extends for example in a curved, ramp-like or step-like manner. The spacing remaining constant is intended in this instance to be understood to mean that the spacing does not change at all, or only to a very small degree, for example, at a small angle with respect to the vehicle longitudinal direction. For example, the spacing with respect to the cover may increase or decrease toward the rear.

In a further refinement of the invention, in the closed position of the cover, a path of the first slotted link has a front section, which runs substantially vertically, a middle section, in which a spacing between the first slotted link and the cover increases toward the rear in a vehicle longitudinal direction, and a rear section, in which the spacing between the first slotted link and the cover remains constant. Here, the spacing remaining constant and variation of the spacing are to be understood analogously to the description given above.

By way of a path of said type of the first slotted link, it is possible, during a displacement of the sliding carriage, for the deployment rod to be displaced relative to the rear deployment lever before said deployment rod controls a deployment of the rear deployment lever.

In a further refinement of the invention, the first coupling element of the rear deployment lever is arranged close to the pivotable coupling between the rear deployment lever and the cover, in particular closer to the aforementioned pivotable coupling than to the pivotable coupling between the rear deployment lever and the fixed bearing. In this way, it is possible to realize a particularly good support ratio in the deployed state of the cover. In the deployed state, for example in the venting position of the cover, the deployment rod is locked in an X direction relative to the guide rail. Here, the deployment rod must accommodate the forces of the cover in particular in the X direction. Said forces are very much dependent on a lever moment between the first coupling element and the pivot axis of the fixed bearing. By virtue of the fact that the first coupling element is arranged close to the pivotable coupling between the rear deployment lever and the cover, a greater lever moment is realized in relation to a coupling element which is arranged close to the visible coupling between the rear deployment lever and the fixed bearing, that is to say close to the pivot axis. In particular if the fixed bearing is arranged below the base of the guide rail and the deployment rod is displaced substantially parallel to the vehicle longitudinal direction or parallel to the roof lining, a large lever moment would be generated. The large lever moment has the advantage that the deployment rod must accommodate less force in order to accommodate forces in the X direction and ensure the locking in the X direction. Accordingly, the deployment rod can also be dimensioned to be smaller, whereby, inter alia, it is possible for production and material costs to be saved.

In a further refinement of the invention, the arrangement furthermore has a second slotted link which is fixed with respect to the guide rail. Furthermore, the deployment rod has a second coupling element which engages with the second slotted link, such that, starting from a closed position of the cover, during a displacement of the sliding carriage, the second slotted link controls the overrun of the bearing secured to the vehicle. By means of the second slotted link, the deployment rod is, by way of the second coupling element, guided so as to be displaceable relative to the vehicle longitudinal direction and to the guide rail. In particular, the second slotted link controls the overrunning, that is to say, as mentioned in the introduction, the vertical raising of the deployment rod during the displacement of the sliding carriage over the fixed bearing.

Further refinements are described in the subclaims and in the following detailed description of an exemplary embodiment.

The exemplary embodiment will be described below with the aid of the appended figures.

BRIEF DESCRIPTIONS OF THE DRAWINGS

DETAILED DESCRIPTION

Elements or features having the same construction or function are given the same reference designations throughout the figures. Elements or features which have already been described using reference designations are not necessarily provided with reference designations in all of the figures.

Figure 1:
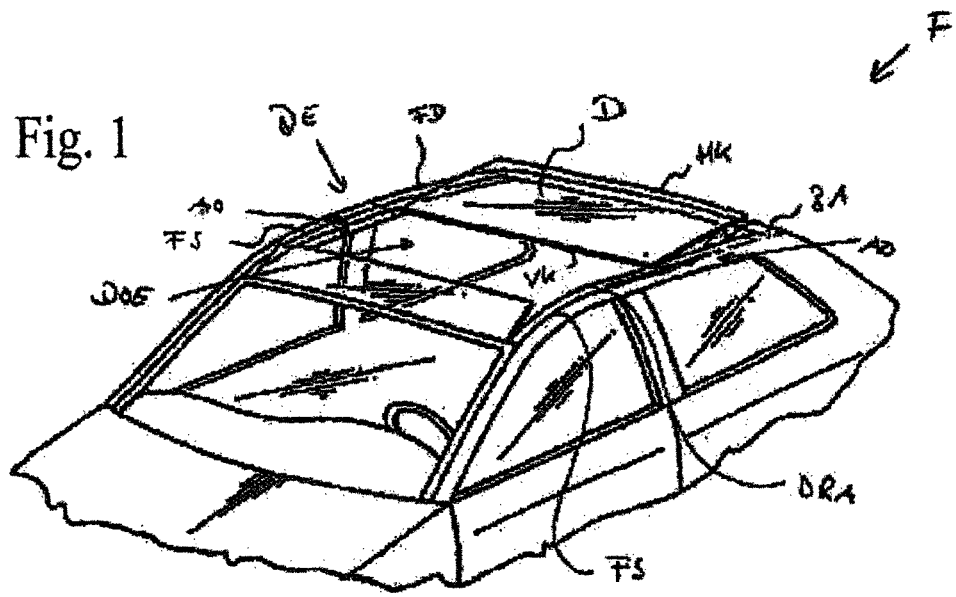
FIG. 1 shows a schematic, perspective view of a vehicle.

FIG. 1 is a schematic, perspective view of a vehicle F having a vehicle roof FD. The vehicle roof FD has a securing section BA which is secured to the vehicle and which is constructed as a roof shell. The securing section BA which is secured to the vehicle is provided with a roof opening DOE which is selectively closed or at least partially openable by means of an adjustable movable roof element DE.

The roof opening DOE is delimited by a roof frame section DRA which is constructed on the vehicle roof FD. The roof frame section DRA has guide rails FS which are preferably arranged at both sides.

The roof element DE has a cover D and is supported so as to be displaceable relative to the guide rails FS in the region of the securing section BA. In this instance, the roof element DE is displaceably supported by means of a cover carrier and arrangements AO in the guide rails FS. The cover D is preferably constructed as a glass cover.

The arrangements AO which are arranged in the region of the guide rails FS serve to displace the cover D which closes the roof opening DOE of the vehicle roof FD from a closed position into an open position in order to thus open the roof opening DOE of the vehicle roof FD. To this end, the arrangements AO have deployment means. For opening, the cover D is pushed over a rear section of the vehicle roof FD. To this end, it is necessary for the cover D to be raised since, in the closed position, it terminates flush with the upper side of the vehicle roof FD. During a typical movement sequence, a rear edge HK of the cover D is first deployed. This intermediate position is also referred to as a venting position. During the further course of the opening movement, the cover D thereafter is displaced in the vehicle longitudinal direction toward the rear, over the vehicle roof FD, into the open position.

This typical movement sequence is carried out using the arrangements AO which are described in greater detail with reference to the following FIGS. 2 to 5. In this instance, in FIGS. 2 to 5, in each case only one arrangement AO is illustrated at one side with the associated mechanism. However, all the components are arranged in a mirror-symmetrical manner with respect to a longitudinal center plane of the vehicle F at both sides of the roof opening DOE. The arrangement AO can also be referred to as a deployment device.

It should be noted that FIGS. 2 to 5 illustrate only the cover carrier DT which is securely coupled mechanically to the cover D. Consequently, the cover D is directly coupled to the deployment means and can be moved by way of the latter. A displacement of the cover D is accordingly synonymous with a displacement of the cover carrier DT.

Furthermore, FIGS. 2 to 5 each illustrate a coordinate system which indicates the directions Z and X. The X direction may in this case also be referred to as vehicle longitudinal direction or horizontal direction. The Z direction may also be referred to as vertical direction.

Figure 2:
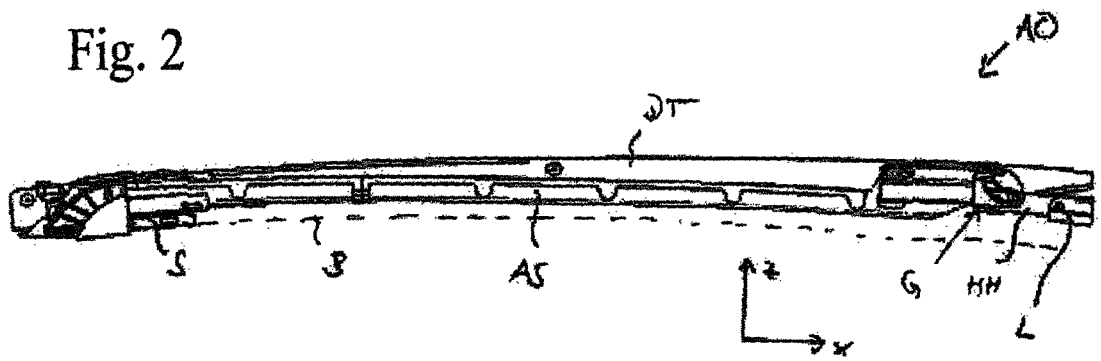
FIG. 2 shows a side view of an arrangement with a cover for a vehicle roof of the vehicle.

FIG. 2 is a schematic side view of an arrangement AO. The arrangement AO comprises a sliding carriage S which can be displaced in a vehicle longitudinal direction in a guide rail FS (not illustrated) by means of a drive. Furthermore, the arrangement AO comprises a deployment rod AS, a fixed bearing L and a rear deployment lever HH. The rear deployment lever HH is pivotably connected to a slider G which is displaceably guided on the cover carrier DT. The rear deployment lever HH is thus pivotably coupled to the cover D. In FIG. 2, the closed position of the cover D is illustrated.

If, starting from the closed position of the cover D, the sliding carriage S is displaced, the deployment rod AS is also displaced, parallel to the vehicle longitudinal direction, toward the rear, because the deployment rod AS is mechanically coupled to the sliding carriage S. In this instance, as will be described in detail further below, the rear deployment lever HH is pivoted with respect to the bearing L so that the cover carrier DT or the cover D is deployed or raised in the region of the rear edge HK. In this state, the cover D is in the venting position. If the sliding carriage S is displaced further toward the rear, the sliding carriage S is decoupled from the deployment rod AS, wherein at the same time, the deployment rod AS is secured in a fixed manner with respect to the guide rail FS by means of a locking mechanism (not described in any more detail). This means that the rear deployment lever HH is also locked in a fixed manner with respect to the guide rail FS in the deployed position. During the further displacement of the sliding carriage S, the latter drives the cover carrier DT along and pushes the cover carrier DT and consequently the cover D over the vehicle roof FD into the open position. As described, for this purpose, the rear deployment lever HH is displaceably coupled to the cover carrier DT via the slider G, such that the cover D can be displaced relative to the rear deployment lever HH.

Figure 3:
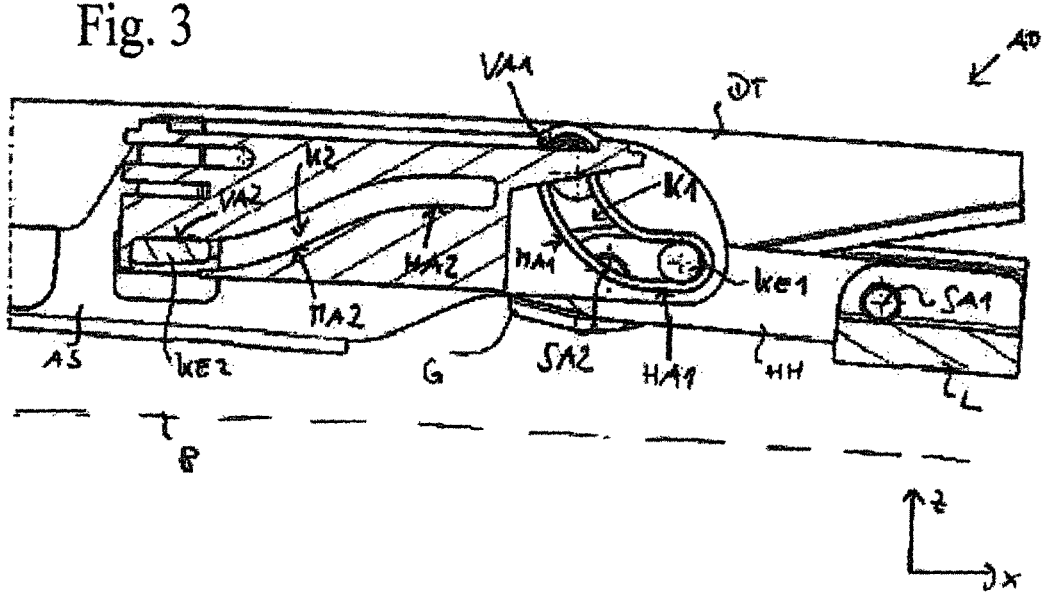
FIG. 3 shows an enlarged, partially sectional side view of the arrangement in a closed position.
Figure 4:
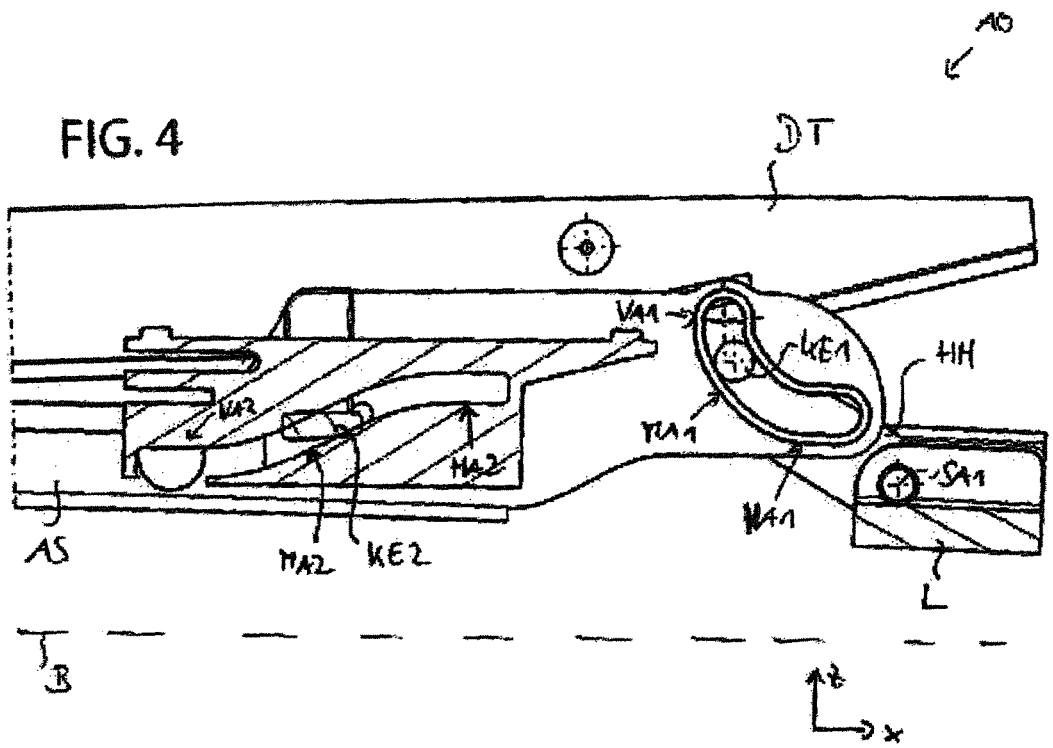
FIG. 4 shows an enlarged, partially sectional side view of the arrangement in a partial venting position.
Figure 5:
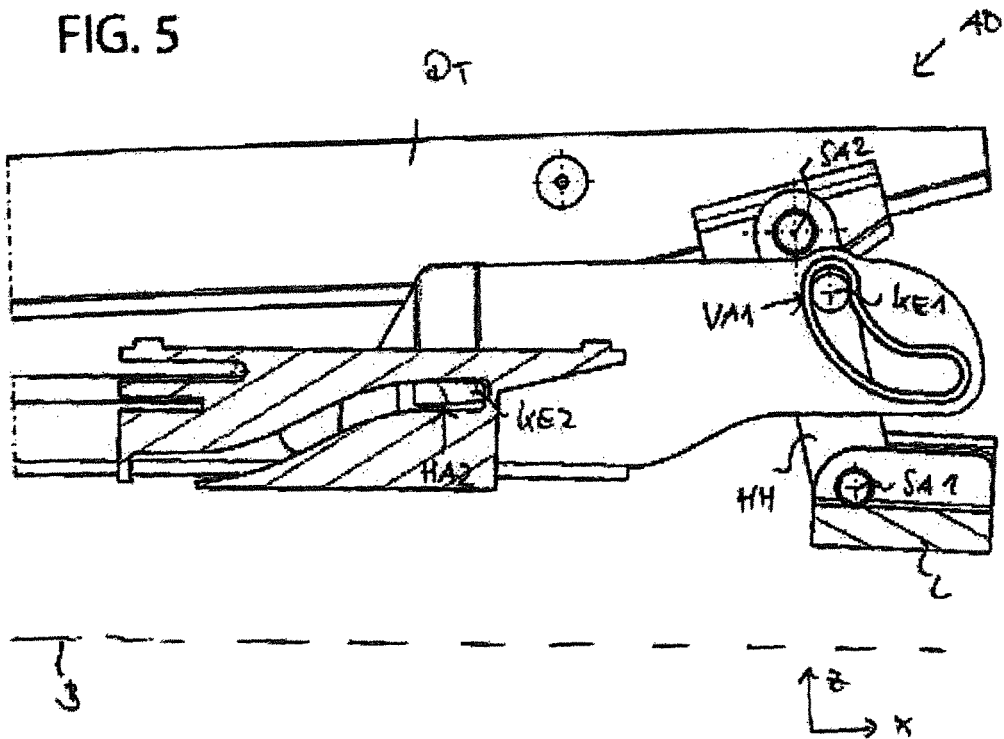
FIG. 5 shows an enlarged, partially sectional side view of the arrangement in a venting position.

In the following FIGS. 3 to 5, the deployment means of the arrangement AO in the rear region are discussed in detail. Here, FIG. 3 shows the arrangement AO in the closed position of the cover D, FIG. 4 shows the arrangement with a partially deployed cover D, and FIG. 5 shows the arrangement AO in a deployed state of the cover D or in the venting position. Here, FIGS. 3 to 5 schematically illustrate in each case partially sectional side views of the arrangement AO.

FIGS. 3 to 5 illustrate in each case a rear end of the deployment rod AS. Furthermore, the fixed bearing L, the rear deployment lever HH and the cover carrier DT are illustrated. The rear deployment lever HH is coupled, pivotably with respect to a first pivot axis SA1, to the fixed bearing L. Furthermore, the rear deployment lever HH is coupled, pivotably with respect to a second pivot axis SA2, to the slider G, which is guided so as to be in a relatively displaceable manner on the cover carrier DT.

As can furthermore be seen in FIGS. 3 to 5, the deployment rod AS has, at the rear end thereof, a first slotted link K1. This is in engagement with a first coupling element KE1 of the rear deployment lever HH. In the closed position of the cover D, the first slotted link K1 has a path in which, toward the rear in the vehicle longitudinal direction, a spacing between the first slotted link K1 and the cover D initially varies and subsequently remains constant. To this end, the path has a front section VA1 which extends substantially in a vertical manner. Furthermore, the path has a central section MA1 in which the spacing between the first slotted link K1 and the cover D increases toward the rear. In addition, the first slotted link K1 has a rear section HA1 in which the spacing between the first slotted link K1 and the cover D remains constant. In the closed position of the cover, the first coupling element KE1 is located in the rear section HA1.

As can be seen in FIG. 3, the fixed bearing L of the arrangement AO is arranged in such a manner that the first pivot axis SA1 of the fixed bearing L is located above a base B, indicated by dashed lines, of the guide rail FS. A base B of the guide rail FS is intended in this instance to be understood to be a plane normal with respect to the image plane of FIGS. 3 to 5, which plane extends substantially tangentially to the vehicle roof FD underneath the sliding carriage S and has the largest spacing with respect to the cover D in the closed position. As mentioned, the sliding carriage S is displaceably arranged in the guide rail FS, wherein the guide rail FS extends tangentially with respect to the vehicle roof FD. The guide rail FS substantially comprises a C-profile which is open in an upward direction, that is to say in a direction facing the cover D in the Z direction, and inside which the sliding carriage S is guided.

Furthermore, the deployment rod AS has a coupling element KE2 by means of which the deployment rod AS is guided in a second slotted link K2 which is fixed with respect to the guide rail FS. The second slotted link K2 has, in the closed position of the cover D, a path with a front section VA2 in which a spacing between the second slotted link K2 and the cover D remains constant. The second slotted link K2 has a central section MA2 in which a spacing between the second slotted link K2 and the cover D decreases toward the rear in the vehicle longitudinal direction. Finally, the second slotted link K2 has a rear section HA2 in which a spacing between the second slotted link K2 and the cover D remains constant. In the closed position of the cover D, the second coupling element KE2 of the deployment rod AS is located in the front section VA2 of the second slotted link K2.

If the sliding carriage S is now displaced in the opening direction, that is to say toward the rear in the X direction, by means of the drive, the deployment rod AS is displaced toward the rear as a result of the mechanical coupling with respect to the sliding carriage S. In this instance, the second coupling element KE2 of the second slotted link K2 moves in the direction of the central section MA2. The rear deployment lever HH is initially not changed in terms of its position, that is to say not pivoted about the pivot axis SA1 of the fixed bearing L. Rather, the deployment rod AS is displaced relative to the rear deployment lever HH, wherein the first coupling element KE1 of the rear deployment lever HH is guided in the first slotted link K1 in the direction of the central section MA1. As soon as the first coupling element KE1 is located in the central section MA1, the rear deployment lever HH is pivoted about the pivot axis SA1 as a result of the movement of the sliding carriage S, whereby the cover carrier DT is raised in the region of the rear edge thereof. At the same time, the deployment rod AS is, by means of the second slotted link K2, raised above the second coupling element KE2 so as to perform a vertical movement in the Z direction in addition to the horizontal movement in the X direction. The cover carrier DT and consequently the cover D are now at least partially deployed. This is illustrated in FIG. 4.

If the sliding carriage S is now displaced further toward the rear in the guide rail FS, the second coupling element KE2 is guided in the second slotted link K2 into the rear section HA2, and the first coupling element KE1 is located in the front section VA1 of the first slotted link K1. In this instance, the cover D reaches its maximum deployed position (see FIG. 5). As can be seen in FIG. 5, during the deployment operation, the deployment rod AS has, in the region of the rear end HE thereof in which the first slotted link K1 is also arranged, overrun the fixed bearing L. In particular, the deployment rod AS has overrun a plane which is defined by the two pivot axes SA1 and SA2 in the closed position of the cover D. This means that the deployment rod AS has been raised in a vertical direction by way of the second slotted link K2 in such a manner that said deployment rod is located in the Z direction above the bearing L. This is necessary so that the deployment rod AS does not collide with the bearing L when the rear deployment lever HH is deployed. As a result of the arrangement of the bearing L above the base B of the guide rail FS, as described above, a considerable amount of structural space can be saved which, inter alia, has the effect that more headroom can be provided in a vehicle.

If the sliding carriage S is displaced further in the guide rail FS, starting from the venting position shown in FIG. 5, the deployment rod AS is locked in a fixed manner with respect to the guide rail FS by means of the locking mechanism and is decoupled from the sliding carriage S. In this way, the rear deployment lever HH is held in its position. The X-direction forces of the cover or of the cover carrier are in this case transmitted by the front section VA1 of the first slotted link K1 to the deployment rod AS.

By virtue of the fact that the first coupling element KE1 is arranged very close to the coupling between the rear deployment lever HH and the slider G, that is to say the second pivot axis SA2, the first coupling element KE1 is spaced apart to a very great extent from the first pivot axis SA1 or from the coupling between the rear deployment lever HH and the fixed bearing L. In this way, a large lever is realized between the first coupling element KE1 and the first pivot axis SA1. This advantageously has the effect that, for the deployment of the rear deployment lever HH, less force is required in order to realize the required deployment moment. Similarly, the deployment rod AS, in the deployed position as per FIG. 5, has to impart or accommodate less force in order to accommodate the X-direction forces acting on the cover D or on the cover carrier DT. In this way, the drive of the sliding carriage S and the mechanical components, for example the deployment rod AS and/or the sliding carriage S itself, can be dimensioned to be smaller, which saves production costs, material costs and structural space.

The coupling elements KE1 and KE2 are in the form of slide elements. All of the parts and elements illustrated may be modified and/or varied in terms of their explicit shaping, wherein the underlying mechanical and kinematic operating principle, as discussed here, of the arrangement AO should be maintained.

The invention claimed is:

1. An arrangement with a cover for a vehicle roof, which cover, starting from a closed position for closing a roof opening, is raiseable in the rear region thereof for opening using deployment means and which cover is displaceable toward the rear over the vehicle roof into an open position, wherein the deployment means has a sliding carriage which is displaceable in a guide rail along the vehicle longitudinal direction by means of a drive;

has a rear deployment lever with respect to the vehicle longitudinal direction, which rear deployment lever is pivotably coupled to the cover and which rear deployment lever is pivotably coupled to a bearing which bearing is stationary fixed with respect to the guide rail and which rear deployment lever has a first coupling element; and has a deployment rod which is pivotably coupled by way of the first coupling element to the rear deployment lever and which deployment rod is, by way of the sliding carriage, displaceable along the vehicle longitudinal direction for the deployment of the rear deployment lever;

wherein the stationary fixed bearing is arranged such that a pivot axis of the stationary fixed bearing is arranged above a base of the guide rail, and wherein the deployment rod is coupled to the first coupling element such that, starting from the closed position of the cover, during a displacement of the sliding carriage along the vehicle longitudinal direction, the deployment rod overruns the fixed bearing.

2. The arrangement as claimed in claim 1, wherein the deployment rod has, for the coupling to the rear deployment lever, a first slotted link which engages with the first coupling element of the rear deployment lever, such that, starting from the closed position of the cover, during a displacement of the sliding carriage, the first slotted link controls a deployment of the cover.

3. The arrangement as claimed in claim 2, wherein the first slotted link has in the closed position of the cover a path in which, toward the rear in the vehicle longitudinal direction, a spacing between the fixed slotted link and the cover initially varies and subsequently remains constant.

4. The arrangement as claimed in claim 2, wherein, in the closed position of the cover, a path of the first slotted link has a front section, which runs substantially vertically, a middle section, in which a spacing between the first slotted link and the cover increases toward the rear in a vehicle longitudinal direction, and a rear section, in which the spacing between the first slotted link and the cover remains constant.

5. The arrangement as claimed in claim 2, wherein the first coupling element of the rear deployment lever is arranged close to the pivotable coupling between the rear deployment lever and the cover.

6. The arrangement as claimed in claim 1, furthermore having a second slotted link which is stationary fixed with respect to the guide rail, and wherein the deployment rod has a second coupling element which engages with the second slotted link, such that, starting from a closed position of the cover, during a displacement of the sliding carriage, the second slotted link controls the overrun of the bearing secured to the vehicle.

7. The arrangement as claimed in claim 6, wherein, in the closed position of the cover, a path of the second slotted link has a front section, in which a spacing between the second slotted link and the cover remains constant, a middle section, in which a spacing between the second slotted link and the cover decreases toward the rear along the vehicle longitudinal direction, and a rear section, in which a spacing between the second slotted link and the cover remains constant.

8. The arrangement as claimed in claim 6, wherein the coupling elements are in the form of slide elements.

* * * * *

UNITED STATES PATENT AND TRADEMARK OFFICE
CERTIFICATE OF CORRECTION

PATENT NO. : 9,902,244 B2
APPLICATION NO. : 15/309771
DATED : February 27, 2018
INVENTOR(S) : Hölzel Page 1 of 1

It is certified that error appears in the above-identified patent and that said Letters Patent is hereby corrected as shown below:

On the Title Page

In the Foreign Application Priority Data section, insert -- July 10, 2014 (DE) .................... 10 2014 109 698.3 -- therefor.

Signed and Sealed this
Second Day of October, 2018

Andrei Iancu
*Director of the United States Patent and Trademark Office*